United States Patent
Long et al.

(10) Patent No.: US 10,586,359 B1
(45) Date of Patent: Mar. 10, 2020

(54) METHODS AND SYSTEMS FOR CREATING WATERFALL CHARTS

(71) Applicant: Workday, Inc., Pleasanton, CA (US)

(72) Inventors: Peter Long, Maroochydore (AU); Tim Berston, Leeming (AU); Kane Fasham, Queensland (AU); Mythili Gopalakrishnan, San Francisco, CA (US); Thomas Peff, Burlingame, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 15/915,558

(22) Filed: Mar. 8, 2018

Related U.S. Application Data

(60) Provisional application No. 62/469,462, filed on Mar. 9, 2017.

(51) Int. Cl.
*G06T 11/20* (2006.01)
*G06Q 40/00* (2012.01)

(52) U.S. Cl.
CPC .......... *G06T 11/206* (2013.01); *G06Q 40/12* (2013.12)

(58) Field of Classification Search
None
See application file for complete search history.

(56) References Cited

U.S. PATENT DOCUMENTS

| | | | | |
|---|---|---|---|---|
| 6,999,081 | B1 * | 2/2006 | Lin | G06Q 10/00 345/440.2 |
| 9,122,668 | B1 * | 9/2015 | Wacha | G06F 17/246 |
| 9,418,455 | B1 * | 8/2016 | Wong | G06T 11/206 |
| 2004/0252136 | A1 * | 12/2004 | Bhatt | G06F 16/248 345/619 |
| 2008/0255973 | A1 * | 10/2008 | El Wade | G06Q 30/06 705/35 |
| 2008/0294680 | A1 * | 11/2008 | Powell | G06F 16/2425 |
| 2011/0130880 | A1 * | 6/2011 | Nishino | F24F 11/30 700/276 |
| 2012/0143653 | A1 * | 6/2012 | Corbo | G06Q 30/0202 705/7.31 |
| 2012/0246189 | A1 * | 9/2012 | Castellanos | G06F 17/18 707/769 |

(Continued)

OTHER PUBLICATIONS

Chris Newman, How to Analyze a Waterfall (Bridge) Chart, Mar. 11, 2015 [online][retrieved from https://www.thespreadsheetguru.com/blog/2015/3/11/how-to-analyze-a-waterfall-bridge-chart][retreived on May 9, 2019 10:26:02 AM].*

*Primary Examiner* — Sultana M Zalalee
(74) *Attorney, Agent, or Firm* — Van Pelt, Yi & James LLP

(57) ABSTRACT

Disclosed is a method for creating a waterfall chart for data analysis. A waterfall chart enables a user to compare two different versions of a quantity and the underlying details for the differences between the two versions. The method comprises: 1) a data setting step including the setting of: a) an open value, b) a close value, c) a breakdown time and d) a breakdown dimension; 2) a data series definition step including defining: a) a reference data point, b) a comparison data point, c) a reference data breakdown series and d) a comparison data breakdown series; 3) a variance series computation step including: a) aligning the reference data breakdown series and the comparison data breakdown series, b) calculating a variance series, and c) creating a waterfall data series; and 4) a chart rendering step.

17 Claims, 10 Drawing Sheets

(56) References Cited

U.S. PATENT DOCUMENTS

| | | | | |
|---|---|---|---|---|
| 2013/0024396 A1* | 1/2013 | Wilhelm | ................ | G06Q 10/06 705/36 R |
| 2013/0036070 A1* | 2/2013 | Ng | ........................ | G06Q 40/04 705/36 R |
| 2013/0044114 A1* | 2/2013 | Burtner | ................ | G06T 11/206 345/442 |
| 2013/0055146 A1* | 2/2013 | Armitage | ............... | G06F 3/0481 715/781 |
| 2014/0085308 A1* | 3/2014 | Huang | ................ | G06F 16/248 345/440.2 |
| 2014/0114747 A1* | 4/2014 | Mah | ................... | G06Q 30/0241 705/14.45 |
| 2014/0278754 A1* | 9/2014 | Cronin | ............... | G06Q 30/0201 705/7.29 |
| 2015/0029213 A1* | 1/2015 | Benson | ................ | G06T 11/206 345/625 |
| 2015/0262396 A1* | 9/2015 | Devarajan | ............ | G06F 16/248 345/440.1 |
| 2016/0180556 A1* | 6/2016 | Deng | ...................... | G06F 16/26 345/440 |
| 2016/0188185 A1* | 6/2016 | Bous | .................... | G06T 11/206 715/202 |
| 2016/0239861 A1* | 8/2016 | Hage | ................. | G06Q 30/0233 |
| 2016/0323249 A1* | 11/2016 | Duncker | ................ | G06F 16/26 |
| 2017/0358112 A1* | 12/2017 | Peters | ................... | G06F 3/0482 |

\* cited by examiner

METHODS AND SYSTEMS FOR CREATING WATERFALL CHARTS

This application claims priority to U.S. Provisional Application No. 62/469,462 entitled METHODS AND SYSTEMS FOR CREATING WATERFALL CHARTS Mar. 9, 2017 which is incorporated herein by reference for all purposes.

TECHNICAL FIELD

The present disclosure relates generally to improving computer systems for analyzing data and particularly for creating waterfall charts.

BACKGROUND

A waterfall chart is a powerful computational tool for analyzing some types of data. In particular, a waterfall chart allows a user to compare two different versions of a quantity and the underlying details for the difference between the two versions. The quantity may be a metric that is of importance to the user; it may be, for example, the amount a product is produced, revenues, costs, etc. The two versions may correspond to, for example, the planned and actual versions, two different time periods, two different regions, two different branches of a company, etc. To find the underlying details of the difference between the two versions, the waterfall chart allows the user to break down the difference into the corresponding differences for multiple components; these differences being called variance steps. The components may be, for example, different models of the product, subaccounts for the revenue or cost accounts, employees, regional offices, etc.

Existing methods for creating a waterfall chart, however, are cumbersome and insufficient. They essentially require a user to calculate all data used by the waterfall chart, including variance steps, and enter those data in a specific form into a data sheet. Moreover, the existing methods often require the user to manually graph the entered data and manipulate the resulting graph to achieve the appearance of a waterfall chart. Moreover, the existing methods do not provide any mechanism for the user to further modify an already created waterfall chart. Some useful modification may include navigating through different time periods, navigating through different dimensions, changing the breakdown method by, for example, choosing a new set of components or drilling down to sub-components, etc. Instead, for each of these modifications, the user needs to go through all of steps of the cumbersome method of creating a new waterfall chart from scratch.

Therefore, what is needed is a user-friendly computational method and system that enables a user to create a waterfall chart with a minimum amount of input and without the need for manually creating or manipulating a graph. Moreover, what is needed is a user-friendly computational method and system that enables a user to modify an already created waterfall chart by, for example, merely entering the type of modification and without the need for re-creating the new waterfall chart from scratch.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure.

In the drawings.

DETAILED DESCRIPTION

Figure 1:
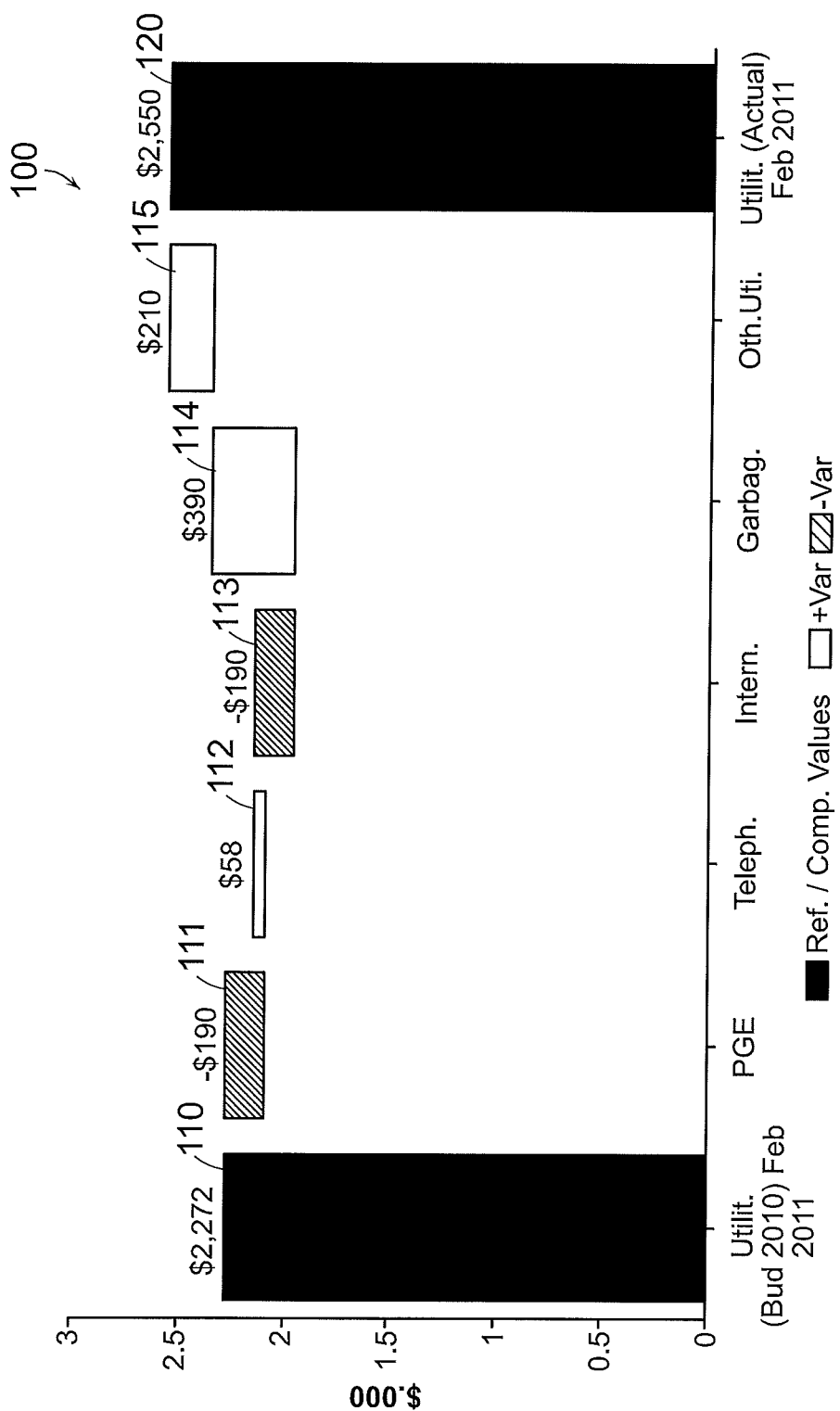
FIG. 1 shows a waterfall chart displaying version variance broken down by Sub-accounts according to some embodiments.

The following detailed description refers to the accompanying drawings. The same or similar reference numbers may be used in the drawings or in the description to refer to the same or similar parts. Also, similarly named elements may perform similar functions and may be similarly designed, unless specified otherwise. Details are set forth to provide an understanding of the exemplary embodiments. Embodiments, e.g., alternative embodiments, may be practiced without some of these details. In other instances, well known techniques, procedures, and components have not been described in detail to avoid obscuring the described embodiments.

In various embodiments, a waterfall chart is created to compare values of some quantity in two different versions, and to break down the difference between the two versions into different components. In some embodiments the two values are called the open and close values. The breakdown into different components is shown as steps, moving up or moving down, that connect the open value to the close value. These steps may be called variance steps.

FIG. 1 shows a waterfall chart 100 for comparing the budgeted and the actual costs for utility spending in an organization for the fall of 2011 according to an embodiment. In chart 100, the ordinate presents the cost in $1000 units. Bar 110 (indicating the open value) shows that the budgeted cost was $2,272. Bar 120 (indicating the close value), on the other hand, shows that the actual cost was $2,550. This indicates that for the fall of 2011, the utility cost account went over the budget by $278. Variance steps 111-115 break down this difference in utility cost into the differences that occurred in subaccounts under the utility cost account. For example, variance steps 111 and 113 (in this case, step downs) show that the PGE and internet subaccounts each spent under their allotted budgets by $190. Variance steps 112 and 114 (in this case, step ups), on the other hand, show that the telephone and garbage subaccounts spent over their allotted budgets by $58 and $390, respectively. Variance step 115 shows that the remaining subaccounts, when added together (labeled other), went over their allotted budgets by $210. The algebraic sum of the over budget values (i.e., step ups $58, $390, and $210) and the under budget values (i.e., step downs −$190 and −$190) results in the difference of $278 in the overall account. Waterfall chart 100, therefore, shows how each subaccount contributed to the overall difference in the overall accounts.

In waterfall chart 100 of FIG. 1, the difference was analyzed through a breakdown into subaccounts as the components.

Figure 4:
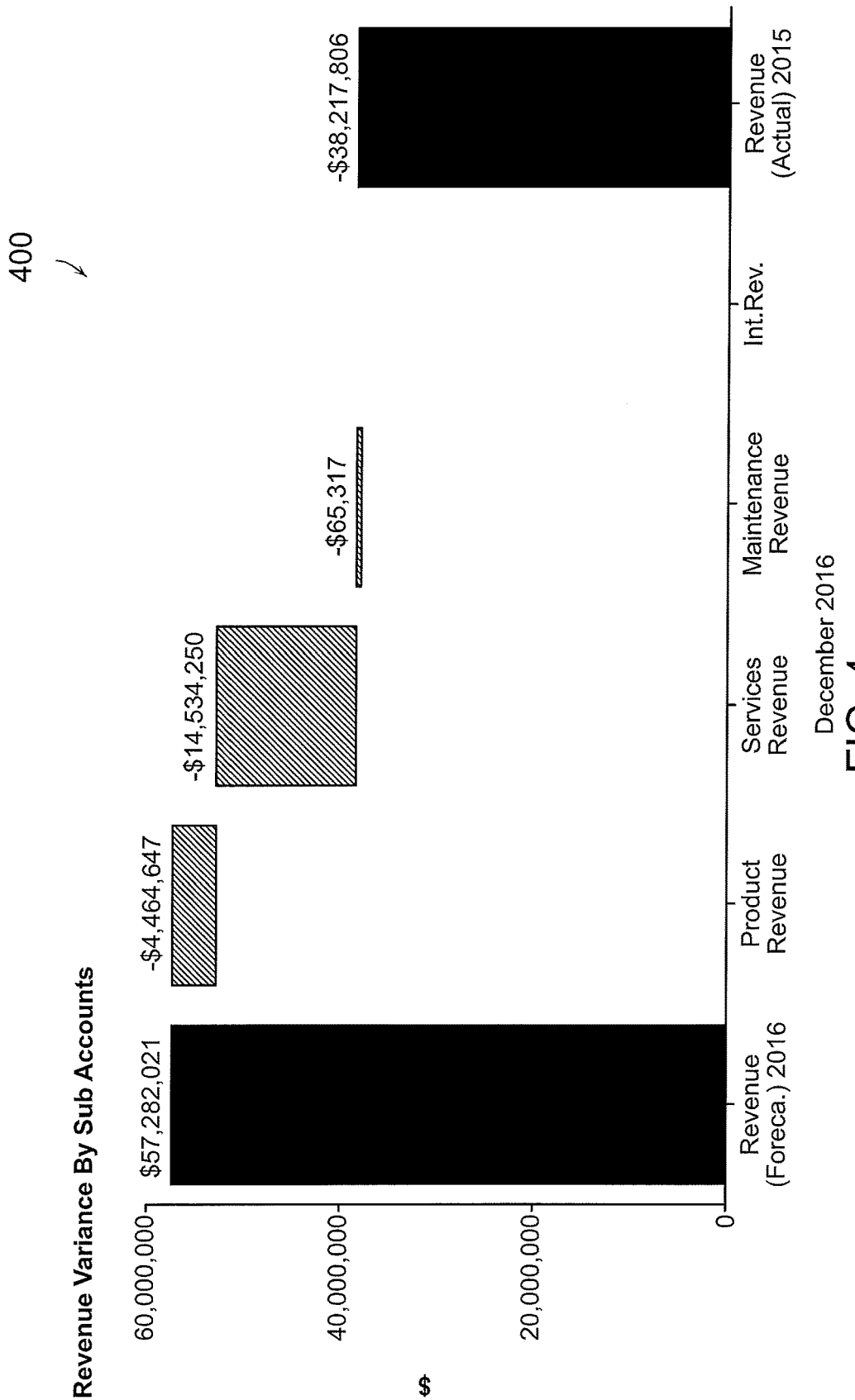
FIG. 4 shows a waterfall chart in which a difference is analyzed through a breakdown into subaccounts according to an embodiment.

FIG. 4 shows another waterfall chart 400, in which a difference is analyzed through a breakdown into subaccounts according to an embodiment. In particular, in chart 400, a difference between the revenue forecast of 2016 and the actual revenue for 2015 is broken down by subaccounts that include product revenue, services revenue, maintenance revenue, etc.

Various embodiments may use breakdowns into other types of components, such as time, or some dimension (e.g., subsidiaries, geographical branches, sales regions, etc.).

Figure 5:
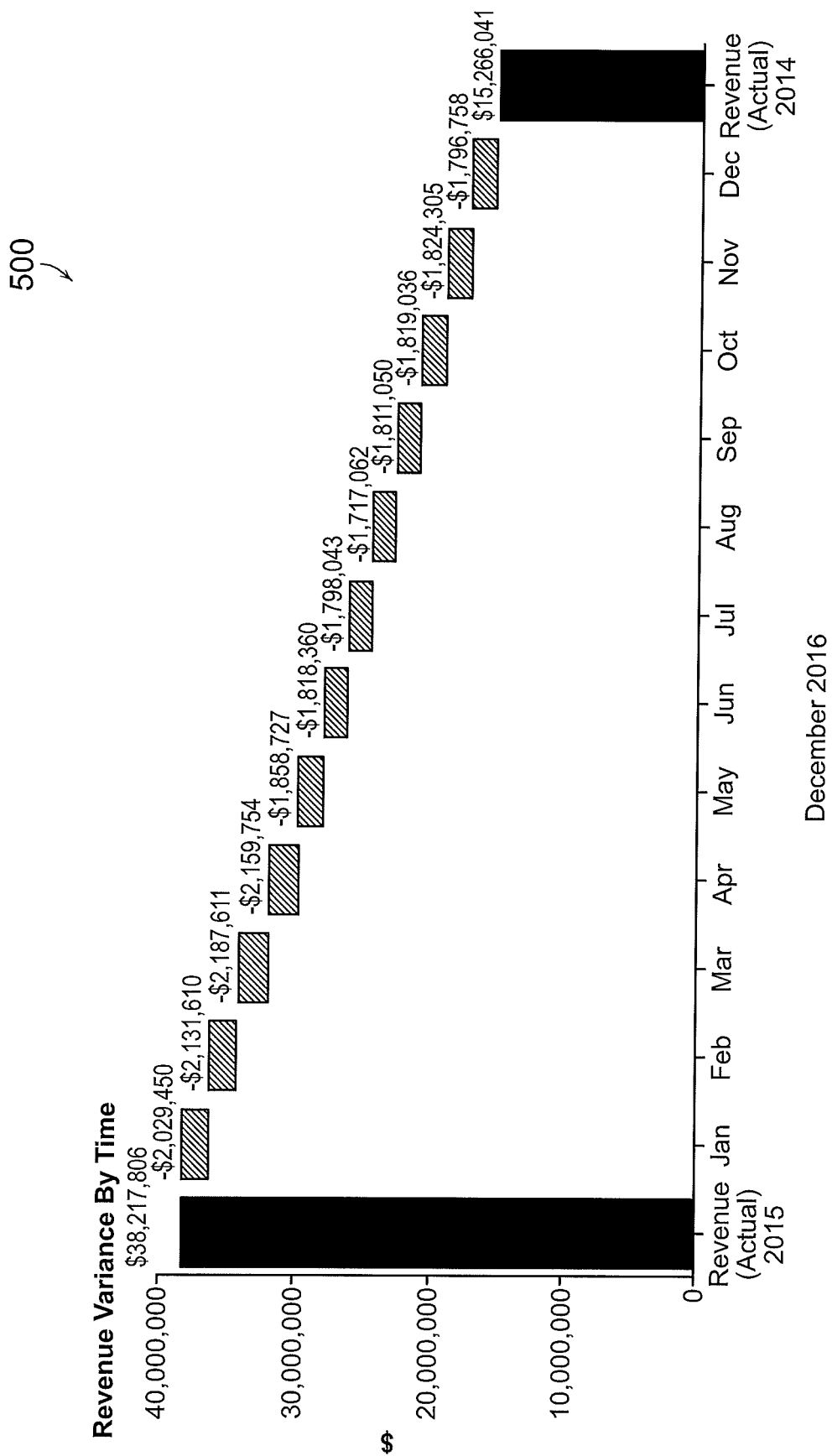
FIG. 5 shows a waterfall chart in which a difference is analyzed through a breakdown into time according to an embodiment.

FIG. 5 shows a waterfall chart 500, in which a difference is analyzed through a breakdown into time according to an embodiment. In particular, in chart 500, a revenue difference between the actual revenue for 2015 and the actual revenue for 2014 is broken down by months of the year, January, February, etc. The variance step for January, for example, is a difference between the actual value of the revenue in January of 2015 and the actual value of the revenue in January of 2014, and so on.

Various embodiments provide a user interface (UI) for creating a waterfall chart. In some embodiments, a user can interact with the UI to select the data to be used for the open and the close value. The user can further interact with the UI to select the method of breakdown into components, e.g., by subaccounts, time, or some dimension. The system can then use those inputs and some pre-populated raw data to create the waterfall chart.

In particular, the system determines the variance step for each component. The system creates a waterfall chart that shows the open value, the close value, and the variance steps connecting these two values.

In some embodiments, a user may select a sorting method for the components and thus the order in which the variance steps are shown. In various embodiments, the sorting method may include sorting by the value of the variance step for each component (e.g., from the highest positive value to the lowest negative value), alphabetical sorting of the component names, chronological sorting when the component is time, etc.

Some embodiments further allow a user to concatenate the number of components and group the remaining ones into a single component labeled, for example, "other." In some embodiments, the user may do so by selecting a criterion for individually displayed components, e.g., setting a minimum value for a displayed variance step. In some other embodiments, the user may limit the number of individually displayed components (i.e., number of individually displayed variance steps) to a maximum step count and also select a sorting method for the components. The system then accordingly sorts the components and displays them as long as their number does not exceed the maximum step count. If the number of displayed components reaches the maximum step count, the system combines the remaining and displays the combination under one last component called, for example, "other."

Some embodiments further enable a user to set a coloring scheme for the waterfall chart. The UI may have a setting to enable selection between two options of whether a positive value for a variance is desired (e.g., when the values are for production or profit) or not desired (e.g., when the values are for costs, such as in FIG. 1). Moreover, the UI may have another color setting for distinguishing between desired and not desired variance. For example, the desired values may be displayed in green and the undesired values in red. Combining these two types of settings, in the first option the system may color the step ups green and the step downs red, and vice versa in the second option. Various embodiments enable a user to select other settings for the coloring scheme.

Figure 2:
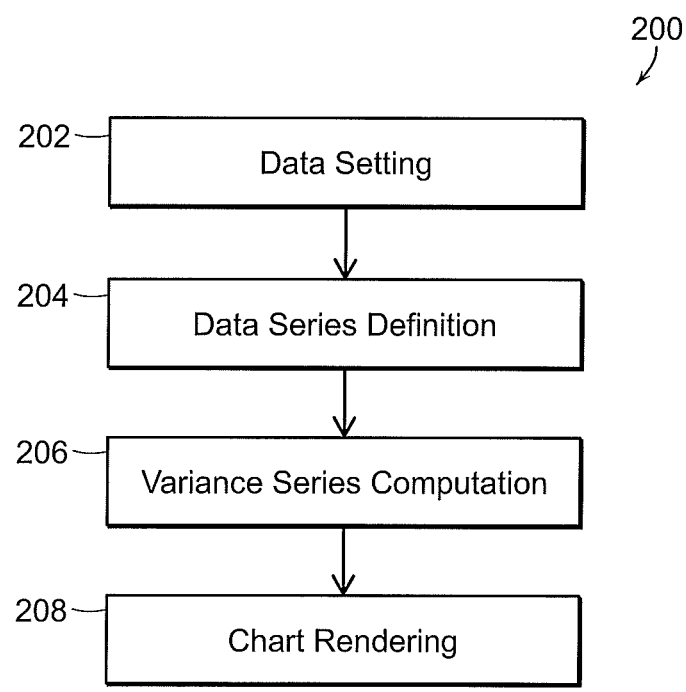
FIG. 2 shows a flowchart that includes steps performed by a waterfall creation system according to some embodiments.

In some embodiments, the waterfall creation system performs steps that are shown in flowchart 200 of FIG. 2. Flowchart 200 includes step 202 for data setting, step 204 for data series definition, step 206 for variance series computation, and step 208 for chart rendering.

The data setting step 202 may include different stages such as setting the open value, setting the close value, setting the breakdown type, setting the breakdown dimension, and setting the maximum step count. The system may receive one or more of these data through UI, or otherwise set them based on a preset default value or a previously saved configuration.

Examples of internal commands for setting the open value (also known as the reference value) and the close value (also known as the comparison value) are respectively shown in forms (1) and (2) below.

Form (1)

Set Waterfall Open Value: Account 1 (Version X, TimePeriod A)

Form (2)

Set Waterfall Close Value: Account 1 (Version Y, TimePeriod B)

In forms (1) and (2), Account 1 is the name of the account that is the source of the data for the waterfall chart. In FIG. 1, for example, Account 1 is the utility spending account.

Versions X and Y are the two versions that will be compared in the waterfall chart. In FIG. 1, for example, these versions are respectively the budgeted and the actual cost versions of the utility spending account.

TimePeriod A and TimePeriod B are the time periods of the account used for the open value and the close value respectively. In FIG. 1, for example, these two time periods are the same time period, that is, fall of 2011. In various embodiments, the open value and the close value may differ in version, in time period, or in both.

Returning to the stages of data setting step 202, the UI may further provide an interface for setting the breakdown type. For example, for the breakdown type, the UI may provide options that include Dimension, Sub-Account, Time, etc. One example of the internal command for setting the breakdown type is shown in form (3) below.

Form (3)

Set Waterfall Breakdown Type: Dimension, Sub-Account, Time

When the breakdown type is Sub-Account, the difference between the open and close value in the account is broken down into the corresponding differences (variances) in the subaccounts of the account. One example of such a breakdown was discussed above in relation to FIG. 1.

When the breakdown type is Time, the open and close values may correspond to the values of the two versions of the account at each time step, as shown and discussed in relation to FIG. 5.

When the breakdown type is Dimension, the difference between the open and close value in the account is broken down into the corresponding differences (variances) in some other subcategories (defined by the dimension type) that exist under the account. Examples of the subcategories (dimension) include subsidiaries and geographical regions such as state, county, etc.

When the breakdown type is Dimension, the UI may further provide an interface for setting the dimension type. For example, the UI may provide options for the dimension type that include subsidiaries, geographical regions, locations, or some other field that is already defined in the data. One example of the internal command for setting the dimension type is shown in form (4) below.

Form (4)
Set Waterfall Breakdown Dimension: Dimension Z

In form (4), dimension Z is the dimension type.

Figure 6:
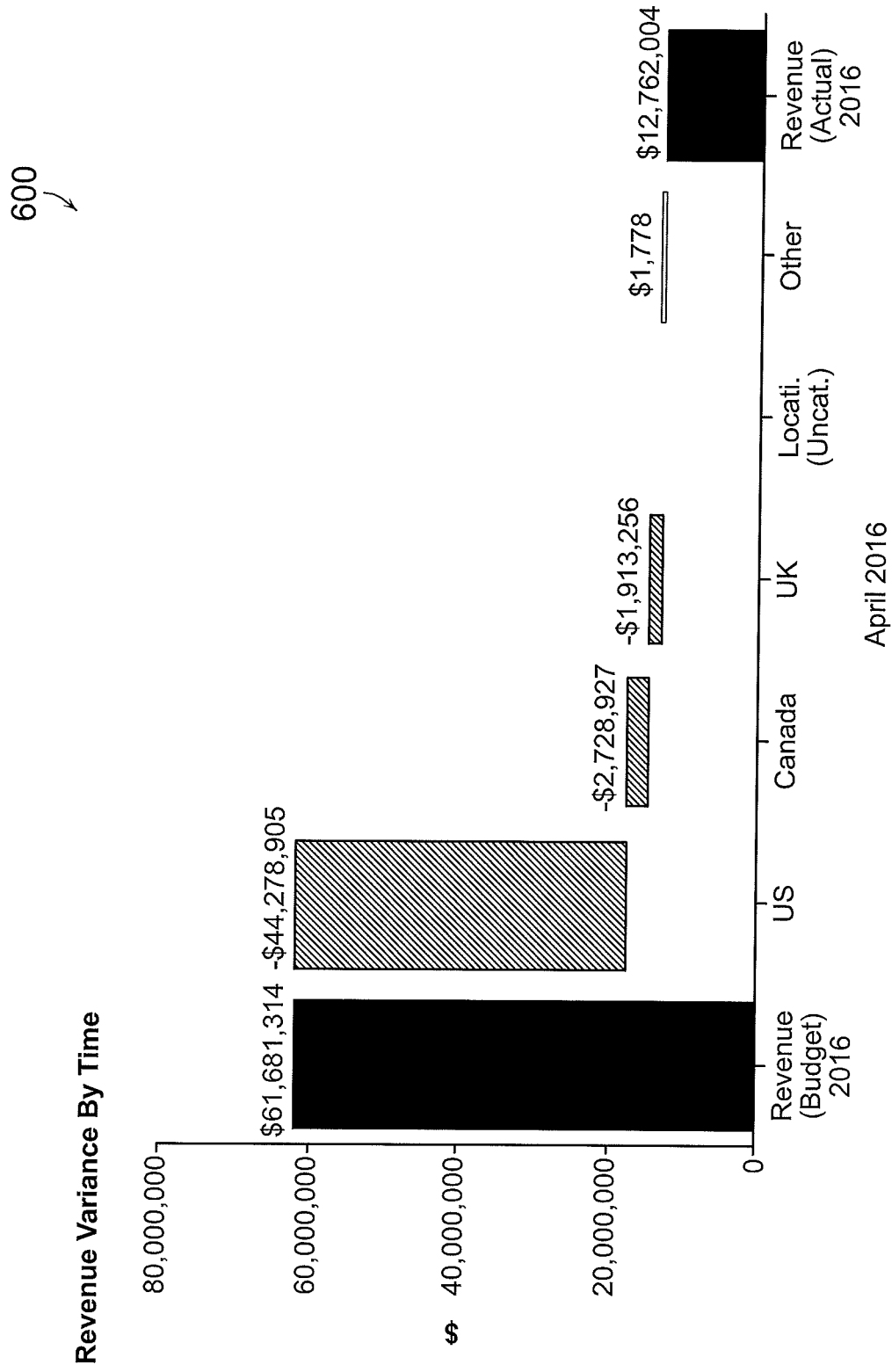
FIG. 6 shows a waterfall chart in which a difference is analyzed through a breakdown into a dimension, here locations, according to an embodiment.

FIG. 6 shows a waterfall chart 600, in which a difference is analyzed through a breakdown into a dimension, here locations, according to an embodiment. In particular, in chart 600, a revenue difference between the budgeted revenue for 2016 and the actual revenue for 2016 is broken down by locations that include US, Canada, UK, etc.

Returning to the stages of data setting step 202, the UI may further provide an interface for setting the maximum step count. As explained above, this parameter may be used to determine the number of components for which the variance is shown individually. The remaining components may not be shown or may be shown after being combined under a single variance step labeled, for example, "other." One example of the internal command for setting the maximum step count is shown in form (5) below.

Form (5)
Set Waterfall Maximum Step Count: S

In form (5), S is an integer number to which the maximum step count is set. In various embodiments, if the maximum step count is not set through the UI, this number may be set to a default number or may not be set, thus requiring the system to show the variance steps for all components individually.

Returning to flowchart 200, the data series definition step 204 may include stages such as defining a reference data point, defining a comparison data point, defining a reference data breakdown series, and defining a comparison data breakdown series. In various embodiments, the system performs the data series definition step based on the inputs received in the data setting step.

The system may define the reference data point as a single data value to be used for the open value for the account. The system may further define the comparison data point as a single data value to be used for the close value for the account. Moreover, the system may define the reference data breakdown series as an array of the opening values each corresponding to one of the components, and define the comparison data breakdown series as an array of the closing values each corresponding to one of the components. In the example of FIG. 1, the reference and comparison data breakdown series are to arrays whose members are respectively the budgeted and actual costs for the subaccounts.

Returning to flowchart 200, the variance series computation step 206 may include stages such as querying for the reference data point, the comparison data point, the reference data breakdown series, and the comparison data breakdown series. Moreover, this step may include stages such as aligning the reference data breakdown series and the comparison data breakdown series, calculating and sorting variance series, concatenating the variance series, determining a remainder value for the variance series, and creating a waterfall data series. The system may perform these queries from the raw data by using the definitions in the data series definition step 204. Query forms (6)-(9) show some exemplary forms for these queries.

Query Form (6)
   Query for Reference Data Point: Ref=[$A1_{VXTA}$]
Query Form (7)
   Query for Comparison Data Point: Comp=[$A1_{VYTB}$]
Query Form (8)
   Query for Reference Data Breakdown Series: Ref Dim Series=[$A1_{VXTAC1}$, $A1_{VXTAC2}$, ..., $A1_{VXTACn}$]
Query Form (9)
   Query for Comparison Data Breakdown Series: Comp Dim Series=[$A1_{VYTBC1}$, $A1_{VYTBC2}$, ..., $A1_{VYTBCn}$]

Query form (6) shows that the system queries the reference data point from the raw data as the value of version X of the account (A1) at time period TA. Query form (7), on the other hand, shows that the system queries the comparison data point from the raw data as the value of version Y of the account (A1) at time period TB. In some embodiments, time periods TA and TB may be the same time period.

Query form (8) shows that the system queries the reference data breakdown series from the raw data as the n-member array that consists of values for version X of each of the n components (C1 to Cn) of the account at time period A. Similarly, query form (9) shows that the system queries the comparison data breakdown series from the raw data as the n-member array that consists of values for version Y of each of the n components of the account at time period B.

In the variance series computation step 206, the system may then perform the stage of aligning the reference data breakdown series and the comparison data breakdown series. Aligning form (10) shows an exemplary form for this stage.

Aligning Form (10)
   $A1_{VXTAC1} \rightarrow A1_{VYTBC1}$, $A1_{VXTAC2} \rightarrow A1_{VYTBC2}$, ..., $A1_{VXTACn} \rightarrow A1_{VYTBCn}$ Aligning form (10) shows that the system aligns (pairs) each member of the reference data breakdown series with a corresponding member of the comparison data breakdown series.

The system may then perform the stage of calculating variance series (VS) by finding the difference between the paired members from the aligning stage. Variance series calculation form (11) shows an exemplary form for this stage.

Variance Series Calculation Form (11)
   VS≡[$VA1_{C1}$, $VA1_{C2}$, ..., $VA1_{Cn}$]=[($A1_{VYTBC1}$−$A1_{VXTAC1}$), ($A1_{VYTBC2}$−$A1_{VXTAC2}$), ... ($A1_{VYTBCn}$−$A1_{VXTACn}$)]

Variance series calculation form (11) shows that the variance series VS is an n-member array [$VA1_{C1}$, $VA1_{C2}$, ..., $VA1_{Cn}$], each member corresponding to one of the components C1 to Cn. The system uses these values for variance steps for the components. Variance series calculation form (11) further shows that each member is calculated by subtracting the corresponding member of the reference data breakdown series from the corresponding member of the comparison data breakdown series.

In some embodiments, if a sorting method is defined, the system may then perform a sorting stage by sorting the members of the variance series according to the sorting method. This may result in a sorted variance series SVS, as shown in sorted variance series form (12).

Sorted Variance Series Form (12)
SVS=[$VA1_{SC1}$, $VA1_{SC2}$, ..., $VA1_{SCn}$], In sorted variance series form (12), SC1-SCn are the components C1-Cn after the sorting.

Moreover, if a concatenation method is defined, the system may concatenate the variance series according to the concatenation method. The concatenated variance series CVS may thus have s members, as shown in concatenated variance series form (13).

Concatenated Variance Series Form (13)

$$CVS=[VA1_{CC1}, VA1_{CC2}, \ldots, VA1_{CCs}]$$

In form (12), s is smaller than or equal to n. The value of s may, for example, be equal to the maximum step count set by default or through the UI.

If the concatenation is based on the sorted variance series SVS, the concatenated variance series CVS may include the first s members of SVS, as shown in concatenated variance series form (14).

Concatenated Variance Series Form (14)

$$CVS=[VA1_{SC1}, VA1_{SC2}, \ldots, VA1_{SCs}].$$

In some embodiments, after concatenation, the system may combine the remaining variances in the variance series as one variance called "other." This remaining variance may be found by adding, algebraically, those remaining variances, as shown in remaining variance calculation form (15).

Remaining Variance Calculation Form (15)

$$VA1_{other}=\text{Sum} (VA1_{Ci} \text{ not included in CVS})$$

When the concatenation is based on selecting the first s members of the sorted variance series, the remaining variance is found by adding the rest of the members, as shown in remaining variance calculation form (16).

Remaining Variance Calculation Form (16)

$$VA1_{other}=\text{Sum}(VA1_{SCs+1}, VA1_{SCs+2}, \ldots, VA1_{SCn})$$

Alternatively, the remaining variance may be found as a value that completes the concatenated variance series such that this completed concatenated variance series, when combined as consecutive steps, can connect the reference data point to the comparison data point. Mathematically, this means that the remaining variance is equal to the difference between the comparison data point and the sum of all members of the concatenated variance series and the reference data point, as shown in remaining variance calculation form (17).

Remaining Variance Calculation Form (17)

$$VA1_{other}=A1_{VYTB}-(A1_{VXTA}+\text{Sum}(VA1_{CC1}, VA1_{CC2}, \ldots, VA1_{CCs}))$$

The remaining variance may be added to the concatenated variance series CVS to create the completed concatenated variance series CCVS, as shown in completed concatenated variance series form (18).

Completed Concatenated Variance Series Form (18)

$$CCVS=[VA1_{CC1}, VA1_{CC2}, \ldots, VA1_{CCs}, VA1_{other}]$$

In different embodiments, a finalized variance series (FVS) is created to be used as variance steps in the waterfall chart. If the system uses concatenation, the finalized variance series FVS may be the completed concatenated variance series CCVS. If, on the other hand, the system uses sorting of the variance series without concatenation, the finalized variance series FVS may be the sorted variance series SVS. In some embodiments, where the system does not use sorting or concatenation, the finalized variance series may be the variance series VS itself.

In various embodiments, the system further creates a waterfall data series (WDS) by combining the reference data point, the finalized variance series FVS, and the comparison data point, as shown in waterfall data series form (19).

Waterfall Data Series Form (19)

$$WDS=[A1_{VXTA}, FVS, A1_{VYTB}]$$

In an embodiment that uses concatenation, for example, the waterfall data series may take the form shown in waterfall data series form (20).

Waterfall Data Series Form (20)

$$WDS=[A1_{VXTA}, CCVS, A1_{VYTB}]=[A1_{VXTA}, VA1_{CC1}, VA1_{CC2}, \ldots, VA1_{CCs}, VA1_{other}, A1_{VYTB}]$$

Returning to flowchart 200, in the chart rendering step 208 the system uses the waterfall data series WDS to render the waterfall chart. In particular, the system may create the waterfall chart by rendering the first data point, the variance steps, and the last data point, as detailed below.

The first data point is rendered as a full column the value of which is the first member of the WDS.

The variance steps are rendered as a sequence of the steps based on the sequence of the remaining members of the WDS, except for the last one. Each step is rendered as a range column that starts from the ending point of the previous column and extends by the value of the corresponding WDS member. In particular, the first variance step starts from the endpoint of the full column drawn for the first data point.

The last data point is rendered as a full column the value of which is the last member of the WDS. Because of the algebraic relation among the members of the WDS (shown, for example, in each of remaining variance calculation forms (15)-(17)), this column should end at the endpoint of the last variance step.

Some embodiments enable modifying a waterfall chart to create a new waterfall chart via operations such as time navigation, dimensional context filtering, or dimensional drill down. For a modification, the system may merely ask for the type modification and otherwise use the data received and used for the patent waterfall chart.

In some embodiments, the time navigation is enabled by using the time setting. Using the time settings, a user may change the time period of the data displayed in the waterfall chart. This change may, for example, change the time period used in forms (1), (2), or both. The system may use the new time period(s) along with the other data already received to render a new waterfall chart.

Figure 7:
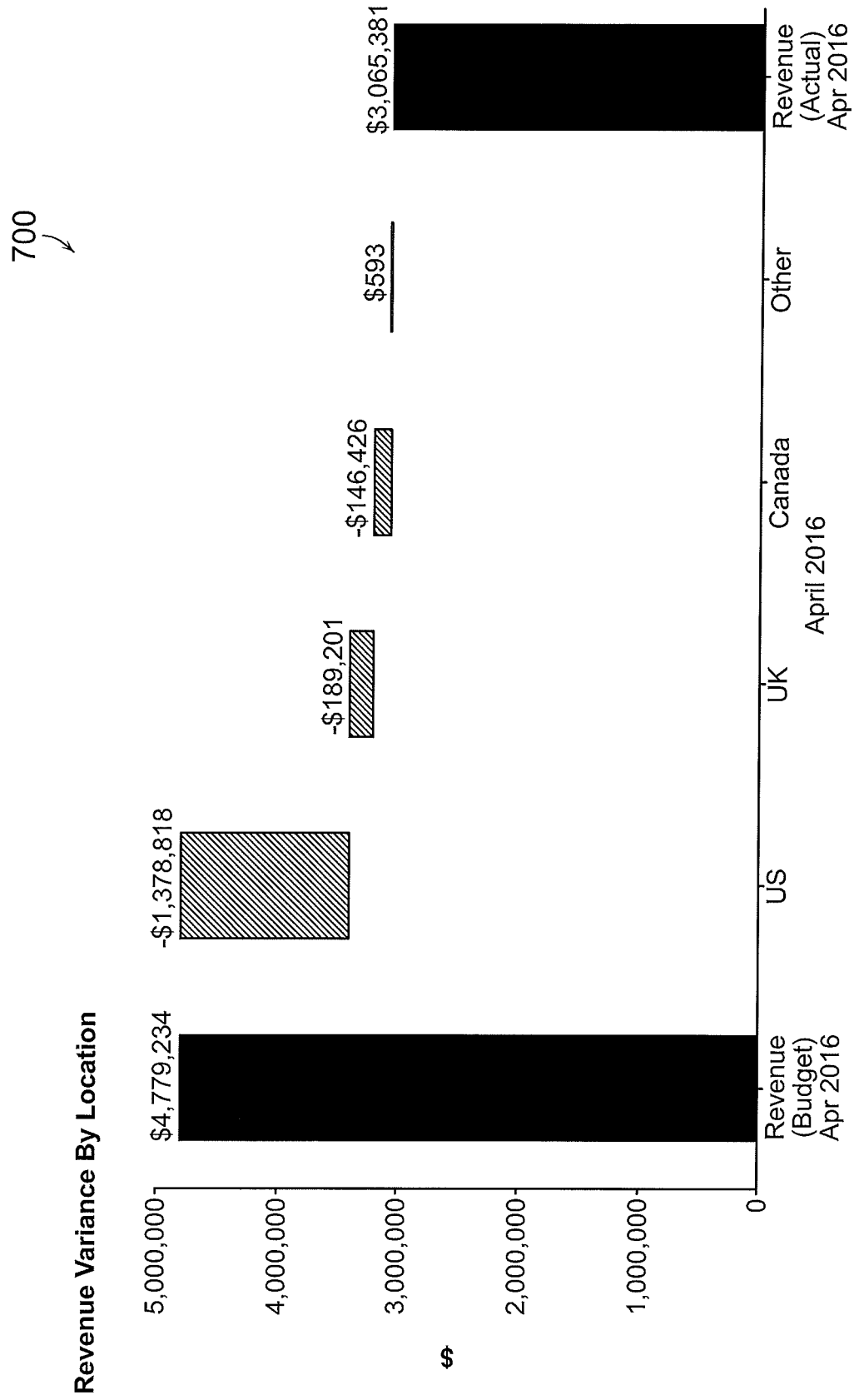
FIGS. 7 and 8 show an example of time navigation according to an embodiment.
Figure 8:
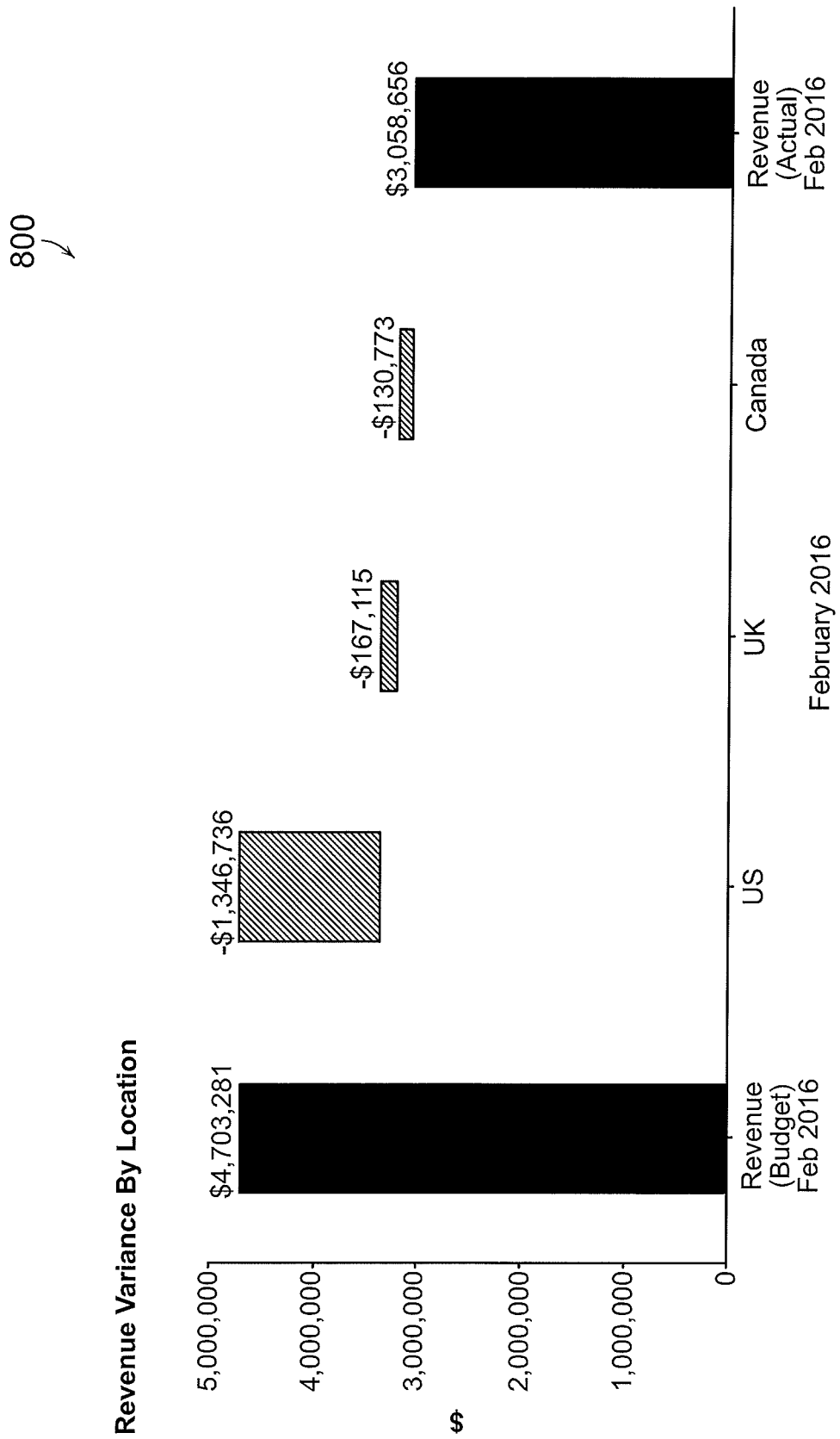

FIGS. 7 and 8 show an example of such time navigation according to an embodiment. FIG. 7 shows a waterfall chart 700 that breaks down by location the difference between the actual and budgeted values of the revenue in April, 2016. FIG. 8, on the other hand, shows a waterfall chart 800 that breaks down by location the difference between the actual and budgeted values of the revenue in February, 2016. A user can switch from one view to the other using the time button at the bottom of the chart.

For the dimensional context filtering, some embodiments enable a user to change a dimension to children of one of the dimension members. For example, in one embodiment, the dimension may relate to different regions in which a company operates. The filtering may enable a user to select one of the regions in the waterfall chart and create a waterfall chart for that region only in which the variances correspond to the subregions in that region.

Figure 9:
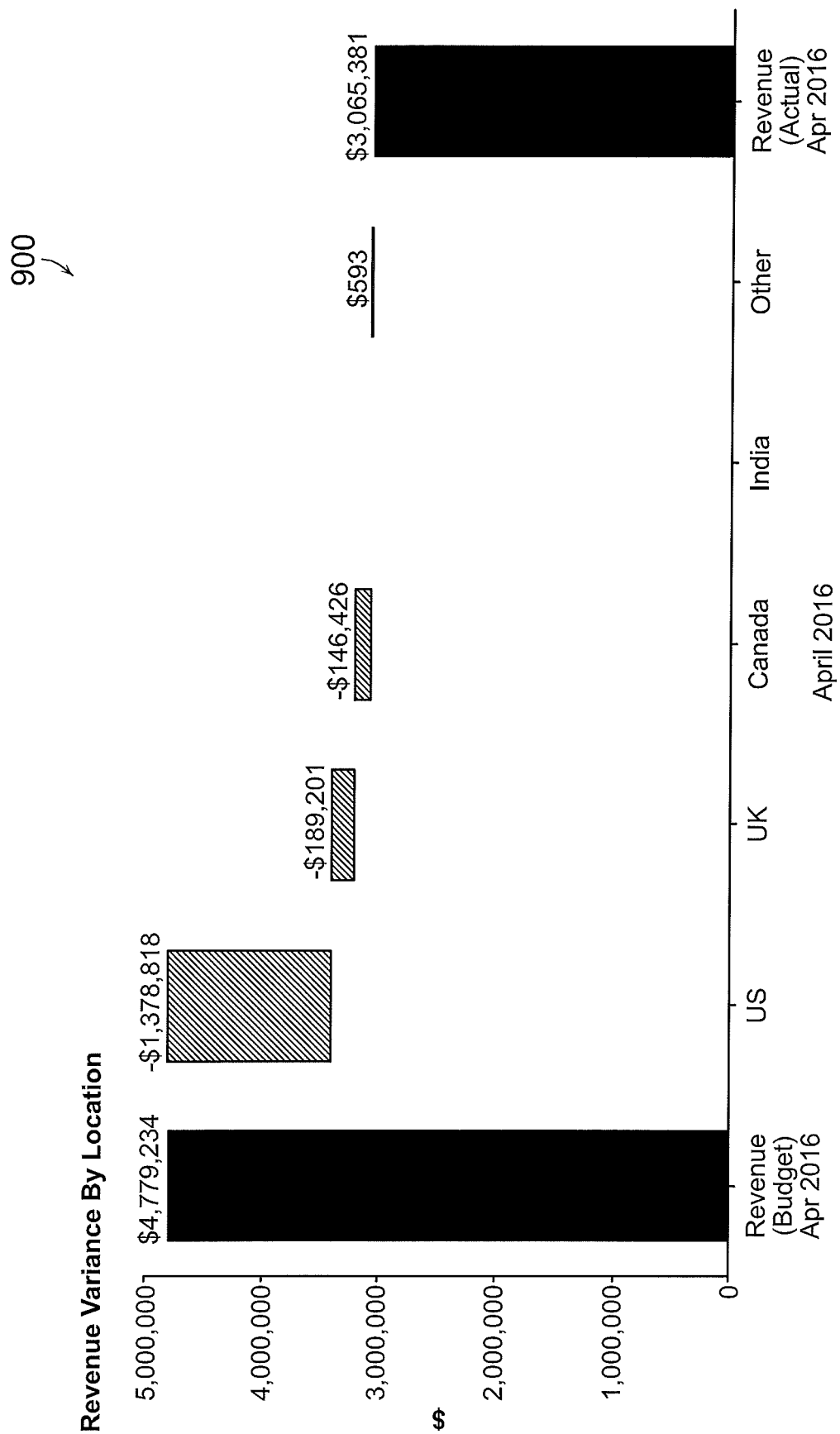
FIGS. 9 and 10 show an example of context filtering according to an embodiment.
Figure 10:
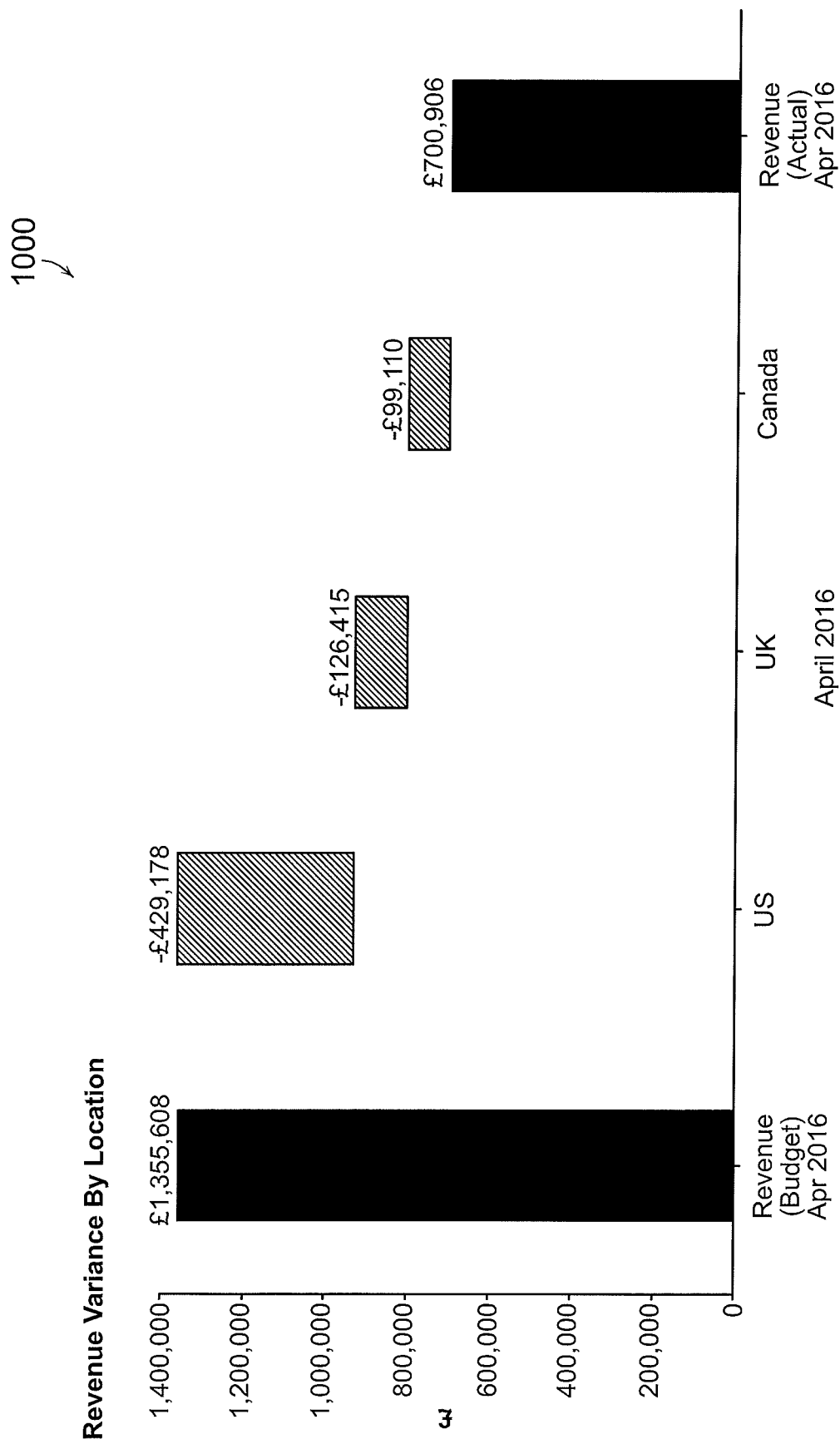

FIGS. 9 and 10 show an example of context filtering according to an embodiment. FIG. 9 shows a waterfall chart 900 that breaks down by location the difference between the actual and budgeted values of the revenue of a company in April, 2016. The values in waterfall 900 are in US dollar. FIG. 10, on the other hand, shows a waterfall chart 1000 that breaks down by location the difference between the actual and budgeted values of the revenue of a subsidiary A of the company in April, 2016. Because the subsidiary is headquartered in UK, for convenience the values in waterfall chart 1000 are in UK pound. A user can switch from waterfall chart 900 to waterfall chart 1000 by selecting a filtering option to filter the data of waterfall chart 900 in the dimension of subsidiaries and selecting subsidiary A.

Figure 3:
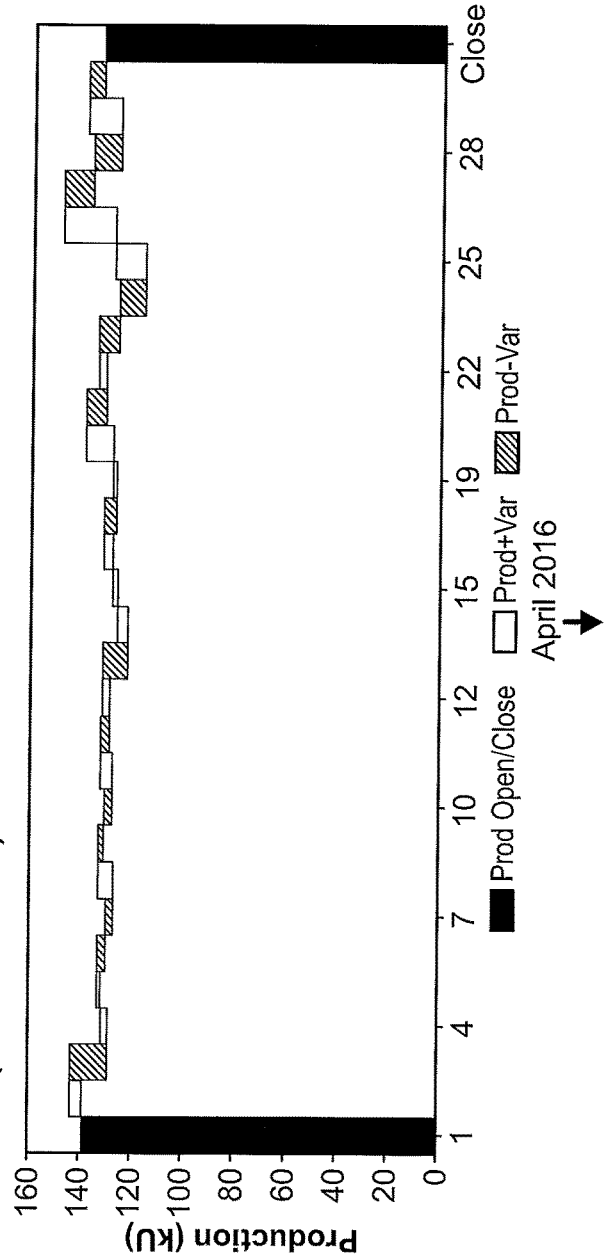
FIG. 3 shows a waterfall chart to which a dimensional drill down is applied according to some embodiments.
Figure 3:
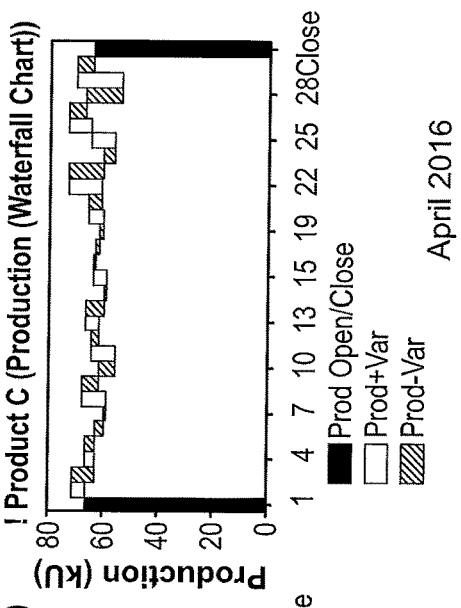
Figure 3:
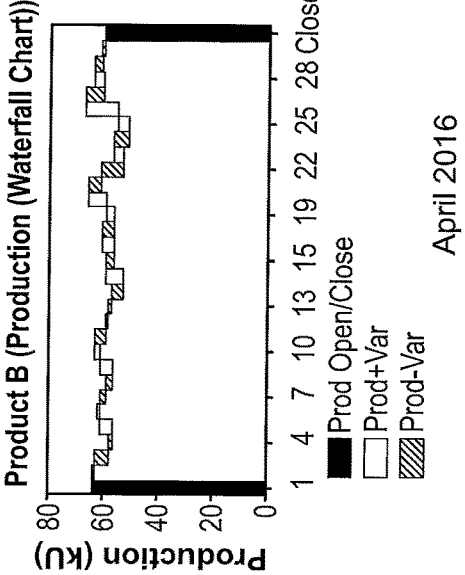
Figure 3:
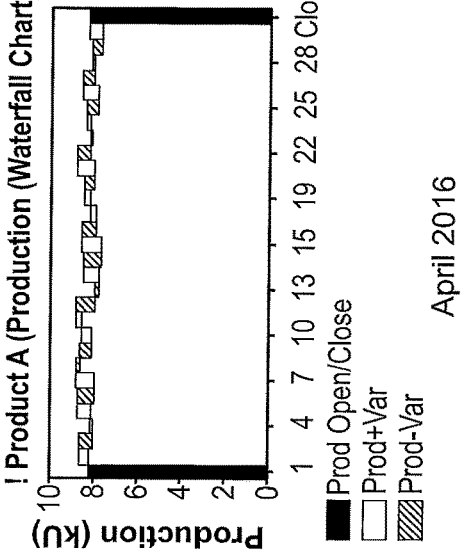

For the dimensional drill down, some embodiments enable user to look into the underlying components of one or more of the variance steps from the point of view of a different dimension. The user may, for example, breakdown the variance step for region by different products (as shown in FIG. 3). In another example, the user may drill down into one or more of the expense accounts (such as those shown in FIG. 1) and break that down by expenses incurred by different employees.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims. Further, stating that a feature may exist indicates that the feature may exist in one or more embodiments.

In this disclosure, the terms "include," "comprise," "contain," and "have," when used after a set or a system, mean an open inclusion and do not exclude addition of other, non-enumerated, members to the set or to the system. Further, unless stated otherwise or deducted otherwise from the context, the conjunction "or," if used, is not exclusive, but is instead inclusive to mean and/or. Moreover, if these terms are used, a subset of a set may include one or more than one, including all, members of the set.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the described steps need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A computer implemented method for creating waterfall charts, the method comprising:
   a data setting step including setting a first plurality of data, wherein the first plurality of data comprises an open value, a close value, and a breakdown type, wherein the breakdown type is set to a first dimension associated with a first display format for a first value;
   a data series definition step including defining a second plurality of data based on the first plurality of data, wherein the second plurality of data comprises a reference data point, a comparison data point, a reference data breakdown series, and a comparison data breakdown series;
   a variance series computation step based on the second plurality of data, wherein the variance series computation step comprises calculating a variance series and creating a first waterfall data series based on the variance series;
   a first chart rendering step comprising creating a first waterfall chart based on chart rendering data that comprise the first waterfall data series, wherein the first waterfall chart displays the first waterfall data series in the first display format for the first value;
   resetting the breakdown type from the first dimension to a second dimension, wherein the second dimension is a child of the first dimension, wherein the second dimension is associated with a second display format for a second value, and wherein the first display format for the first value is different from the second display format for the second value; and
   a second chart rendering step comprising creating a second waterfall chart based at least in part on the second dimension, wherein the first waterfall chart displays a second waterfall data series in the second display format for the second value.

2. The computer implemented method of claim 1, further comprising determining a plurality of components for the waterfall chart based on the breakdown type.

3. The computer implemented method of claim 2, wherein:
   the reference data breakdown series includes an array of opening values for the plurality of components; and
   the comparison data breakdown series includes an array of closing values for the plurality components.

4. The computer implemented method of claim 1, wherein the second dimension is locations, subsidiaries, or geographical regions.

5. The computer implemented method of claim 1, wherein the first plurality of data further comprises a maximum step count.

6. The computer implemented method of claim 1, wherein defining the reference data point includes using the open value and defining the comparison data point includes using the close value.

7. The computer implemented method of claim 1, wherein calculating the variance series compromises:
   aligning the reference data breakdown series and the comparison data breakdown series; and
   finding a plurality of differences between each member of the reference data breakdown series and a corresponding member the comparison data breakdown series as resulted from the aligning.

8. The computer implemented method of claim 1, wherein the data setting step further comprises setting a sorting method.

9. The computer implemented method of claim 8, wherein the variance series computation step further comprises sorting a plurality of members of the variance series according to the sorting method to create a sorted variance series.

10. The computer implemented method of claim 9, wherein:
    the method further comprises defining a concatenation method; and
    the variance series computation step further comprises:
       concatenating the sorted variance series based on the concatenation method to create a concatenated variance series and to calculate a reminder variance; and
       adding the remainder variance in the sorted variance series to create a completed concatenated variance series.

11. The computer implemented method of claim 10, wherein the first waterfall data series comprises the reference data point, the comparison data point, and one of the variance data series, the sorted variance series, concatenated variance series, and completed concatenated variance series.

12. The computer implemented method of claim 1, further comprising enabling a time navigation, wherein the time navigation comprises:
   receiving a first time period;
   creating the first waterfall data series corresponding to the first time period;
   creating the first waterfall chart based on the chart rendering data that comprise the first waterfall data series, wherein the chart rendering data is a first chart rendering data;
   receiving a second time period;
   creating a third waterfall data series corresponding to the second time period;
   creating a third waterfall chart based on a second chart rendering data that comprise the third waterfall data series.

13. A computer implemented method for creating waterfall charts, the method comprising:
   a data setting step including setting a plurality of data, wherein the plurality of data comprises an open value, a close value, and a breakdown type, wherein the breakdown type is set to a first dimension associated with a first display format for a first value;
   a variance series computation step based on the plurality of data, wherein the variance series computation step comprises calculating a variance series and creating a first waterfall data series based on the variance series;
   a first chart rendering step comprising creating a first waterfall chart based on chart rendering data that comprise the first waterfall data series, wherein the first waterfall chart displays the first waterfall data series in the first display format for the first value;
   resetting the breakdown type from the first dimension to a second dimension, wherein the second dimension is a child of the first dimension, wherein the second dimension is associated with a second display format for a second value, and wherein the first display format for the first value is different from the second display format for the second value; and
   a second chart rendering step comprising creating a second waterfall chart based at least in part on the second dimension, wherein the first waterfall chart displays a second waterfall data series in the second display format for the second value.

14. The computer implemented method of claim 13, further comprising determining a plurality of components for the waterfall chart based on the breakdown type.

15. The computer implemented method of claim 13, wherein the second dimension is locations, subsidiaries, or geographical regions.

16. The computer implemented method of claim 13, wherein the data setting step further comprises setting a sorting method.

17. The computer implemented method of claim 16, wherein the variance series computation step further comprises sorting a plurality of members of the variance series according to the sorting method to create a sorted variance series.

* * * * *